US008839639B2

(12) United States Patent
Paulson

(10) Patent No.: US 8,839,639 B2
(45) Date of Patent: Sep. 23, 2014

(54) AIR-CONDITIONING CLUTCH OVERRIDE DEVICE AND METHOD

(76) Inventor: Michael Paul Paulson, Valparaiso, IN (US)

(*) Notice: Subject to any disclaimer, the term of this patent is extended or adjusted under 35 U.S.C. 154(b) by 506 days.

(21) Appl. No.: 13/226,861

(22) Filed: Sep. 7, 2011

(65) Prior Publication Data

US 2012/0055176 A1 Mar. 8, 2012

Related U.S. Application Data

(60) Provisional application No. 61/380,650, filed on Sep. 7, 2010.

(51) Int. Cl.
*B60H 1/32* (2006.01)
*B60H 1/00* (2006.01)

(52) U.S. Cl.
CPC .......... *B60H 1/3208* (2013.01); *B60H 1/00764* (2013.01); *B60H 2001/3266* (2013.01); *B60H 2001/3273* (2013.01); *B60H 2001/327* (2013.01)
USPC ................ 62/323.4; 62/230; 62/243

(58) Field of Classification Search
CPC ........................... B60H 1/00764; B60H 1/3208
USPC ................. 62/61, 133, 228.1, 230, 243, 323.4
See application file for complete search history.

(56) References Cited

U.S. PATENT DOCUMENTS

| | | | |
|---|---|---|---|
| 3,462,964 A | 8/1969 | Haroldson | |
| 4,135,368 A * | 1/1979 | Mohr et al. | 62/133 |
| 4,226,090 A * | 10/1980 | Horian | 62/133 |
| 4,299,094 A | 11/1981 | Lummen | |
| 4,355,523 A * | 10/1982 | Shimada | 62/133 |
| 4,359,875 A | 11/1982 | Ohtani | |
| 4,510,764 A | 4/1985 | Suzuki | |
| 4,530,338 A | 7/1985 | Sumi | |
| 4,556,942 A | 12/1985 | Russo et al. | |
| 4,642,770 A | 2/1987 | Shirley | |
| 4,823,555 A | 4/1989 | Ohkumo | |
| 4,914,924 A | 4/1990 | Takahashi | |
| 4,934,328 A * | 6/1990 | Ishii et al. | 123/673 |
| 5,228,305 A | 7/1993 | Vogt | |
| 5,606,947 A * | 3/1997 | Hong | 123/339.17 |
| 5,899,183 A | 5/1999 | Aoki et al. | |
| 6,467,281 B2 | 10/2002 | Iwanami et al. | |
| 6,481,225 B2 | 11/2002 | Kimura et al. | |

* cited by examiner

*Primary Examiner* — Jonathan Bradford
(74) *Attorney, Agent, or Firm* — Hartman Global IP Law; Gary M. Hartman; Domenica N. S. Hartman

(57) ABSTRACT

Methods and devices that use an engine load condition of a vehicle, for example, the vehicle's engine intake manifold or plenum vacuum, to promote the efficiency of the engine. The methods and devices are operable to control the compressor of the vehicle's air-conditioning system, enabling the compressor to be shut off when the vehicle is under relatively high loads. The methods and devices operate by sensing a parameter indicative of an engine load condition of the vehicle, determining a difference between a reading of the parameter and an average based on multiple readings of the parameter, and then engaging and disengaging the compressor clutch depending on whether the reading of the parameter is above or below the average of the parameter. The compressor clutch is engaged if the engine operates under a high load for a duration that is dependent on the average of the parameter.

24 Claims, 3 Drawing Sheets

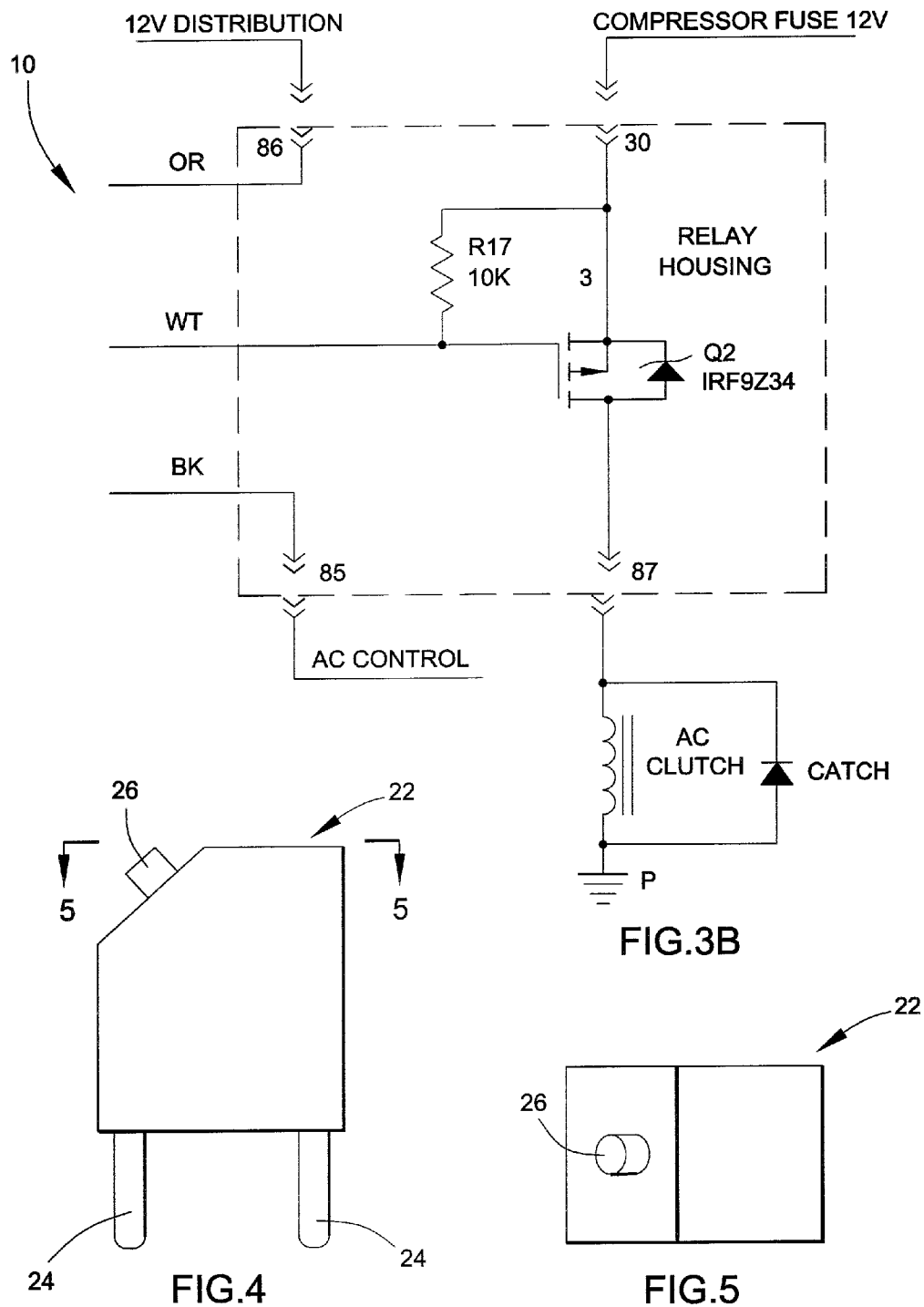

AIR-CONDITIONING CLUTCH OVERRIDE DEVICE AND METHOD

CROSS REFERENCE TO RELATED APPLICATIONS

This application claims the benefit of U.S. Provisional Application No. 61/380,650, filed Sep. 7, 2010, the contents of which are incorporated herein by reference.

BACKGROUND OF THE INVENTION

The present invention generally relates to air-conditioning systems, and more particularly to automotive air-conditioning systems configured to disengage the compressor of the system when the vehicle is under relatively high loads.

The efficiency of an automotive engine's operation can be increased by engaging the compressor of its air-conditioning system to operate the system only when the engine is not loaded or only lightly loaded. As a result, various methods have been proposed for interrupting the operation of air-conditioning systems for the purpose of reducing the load on a vehicle under certain conditions, for example, during acceleration and when operating on an incline. As an example, certain systems have been proposed that engage and disengage a clutch through which power is delivered to the compressor based on one or more parameters that are indicative of the load on the engine.

Engine intake manifold vacuum is a good indicator of engine loading, and therefore air-conditioning systems have been proposed that utilize the engine intake manifold or plenum vacuum level as a parameter for controlling the operation of the compressor. Engine intake manifold vacuum and engine loading are inversely proportional, such that a high manifold vacuum level (in other words, a low manifold absolute pressure relative to ambient atmospheric pressure) corresponds to a low engine load and lower manifold vacuum levels (in other words, manifold absolute pressures relatively closer to ambient atmospheric pressure) correspond to higher engine loads. Therefore, the compressor clutch is disengaged if the manifold pressure level rises above a predetermined threshold indicative of a high engine load, for example, during acceleration, and allowed to re-engage once the manifold pressure level has dropped below a predetermined threshold, for example, after the desired vehicle speed is attained and during vehicle coasting. In this manner, the system operates to override the heating, ventilating, and air-conditioning (HVAC) computer of a vehicle and its control of the compressor.

A complicating factor in the incorporation of systems of the type described above occurs if a vehicle is operated for prolonged periods at high engine loads, for example, when a long incline is encountered. Aside from the annoyance of the passenger compartment becoming warmer than desired, safety issues can arise if weather conditions require that the vehicle's HVAC controls are set to defrost. As a possible remedy, U.S. Pat. No. 5,228,305 proposed means by which the threshold at which an air-conditioning compressor is disengaged can be manually adjusted by the vehicle's operator. However, the necessity for the operator to know how to make such manual adjustments can be burdensome and potentially dangerous.

BRIEF DESCRIPTION OF THE INVENTION

The present invention provides methods and devices that use an indicator for the engine load of a vehicle, for example, the vehicle's engine intake manifold or plenum vacuum, to promote the efficiency of the engine. The methods and devices are operable to control the compressor of the vehicle's air-conditioning system, enabling the compressor to be shut off when the vehicle is under relatively high loads, for example, during acceleration or when operating on an incline.

According to a first aspect of the invention, such a device (10) includes means (X1) for sensing a parameter indicative of an engine load condition of the vehicle, means (Q1) for determining a difference between a reading of the parameter sensed by the sensing means (X1) and an average based on multiple readings of the parameter sensed by the sensing means (X1), and means (Q2) for engaging and disengaging the compressor clutch depending on whether the reading of the parameter is above or below the average of the parameter. The engaging/disengaging means (Q2) engages the compressor clutch if the engine operates under a high load for a duration that is dependent on the average of the parameter.

According to a second aspect of the invention, a method is provided that uses a device (10) comprising the elements described above to promote the efficiency of the vehicle engine.

According to another aspect of the invention, a method of promoting the efficiency of the vehicle engine includes sensing a parameter indicative of an engine load condition of the vehicle, determining a difference between a reading of the parameter and an average based on multiple readings of the parameter, and engaging and disengaging the compressor clutch depending on whether the reading of the parameter is above or below the average of the parameter. The compressor clutch is engaged if the engine operates under a high load for a duration that is dependent on the average of the parameter.

A technical effect of the invention is the ability to automatically disengage an air-conditioning compressor of a vehicle operating at high engine loads, yet also automatically avoid the compressor being disengaged over prolonged periods, for example, when a long incline is encountered. This capability avoids potential safety issues that can arise if weather conditions require the operation of the defrost to maintain visibility through the vehicle's windshield, as well as addresses comfort issues for occupants of the vehicle.

Other aspects and advantages of this invention will be better appreciated from the following detailed description.

BRIEF DESCRIPTION OF THE DRAWINGS

FIGS. 3A and 3B schematically represent an electrical circuit for use as the switching circuit of FIG. 1 in accordance with a preferred embodiment of this invention.

FIGS. 4 and 5 represent front and top views of a module into which the switching circuit of FIGS. 1, 3A and 3B can be incorporated in accordance with a preferred aspect of the invention.

DETAILED DESCRIPTION OF THE INVENTION

As previously noted, engine intake manifold vacuum is a good indicator of engine loading, and therefore engine intake manifold or plenum vacuum level can be used as a parameter for limiting the operation of a compressor of an automotive engine's air-conditioning system when the engine is operating under high loading conditions (other indications of engine load, for example, the throttle position signal of the Engine Control Module (ECM), could be used and are therefore also within the scope of the invention). Because engine intake manifold vacuum and engine loading are inversely proportional, a relatively low manifold vacuum level (in other words, a manifold absolute pressure relatively close to ambient atmospheric pressure) corresponds to a relatively high engine load, whereas higher manifold vacuum levels (in other words, lower manifold absolute pressures relative to ambient atmospheric pressure) correspond to lower engine loads, the present invention can monitor engine intake manifold or plenum pressure levels to disengage the compressor clutch if the manifold pressure level rises above a threshold indicative of a high engine load, for example, during acceleration and long inclines, and then re-engage the clutch once the manifold pressure level has dropped below a threshold, for example, after the desired vehicle speed is attained and during vehicle coasting. In this manner, the system operates to override the heating, ventilating, and air-conditioning (HVAC) computer of a vehicle and its control of the compressor. As discussed below, the threshold at which the clutch disengages and re-engages is not a constant, but a variable that changes as a result of the operating conditions of the vehicle.

Figure 1:
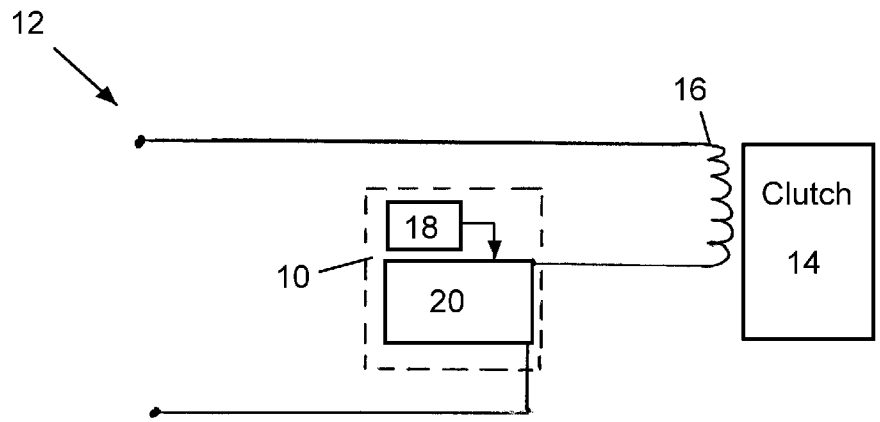
FIG. 1 schematically represents a switching circuit connected to an electrical circuit for operating a compressor clutch of a vehicle air-conditioning (AC) system, wherein the switching circuit is adapted to disengage the compressor clutch if the vehicle is operated at a sufficiently high engine load.
Figure 2:
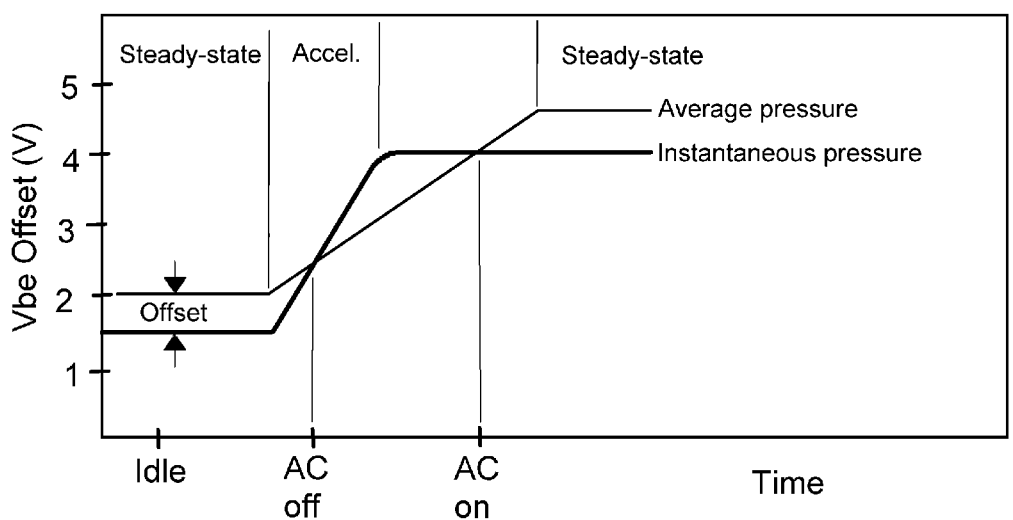
FIG. 2 is a graph representing a preferred functional aspect of the switching circuit of FIG. 1.

Preferred aspects of the invention can be accomplished using a switching circuit 10 represented in FIG. 1 as being installed in an electrical circuit 12 for a compressor clutch 14 of a vehicle air-conditioning (AC) system to interrupt and resume electrical power to a coil 16 that operates the clutch 14. The circuit 10 includes a pressure sensor 18 by which intake manifold pressure (or vacuum) can be used as an input parameter to the circuit 10. The sensor 18 generates an electrical voltage that corresponds to the sensed intake manifold pressure, for example, proportional to the pressure. The electrical voltage serves as an input to a processing circuit 20, such as a microprocessor or other device having a switching capability. As discussed in more detail below, the switching circuit 10 is also operable to maintain a running average of the intake manifold pressure. The average intake manifold pressure can be calculated from multiple pressure readings taken over any suitable time period, though in the preferred embodiment the average is based on readings that are continuously monitored whenever the engine is operating. The processing circuit 20 compares the calculated average to the instantaneous intake manifold pressure reading sensed by the pressure sensor 18 and, as illustrated in FIG. 2, interrupts power to switch the clutch coil 16 "off" if the instantaneous pressure reading rises above the average pressure or, more preferably, above the average pressure plus a predetermined offset ("OFFSET"). A suitable offset, for example, about 4.5 inches Hg (about 0.15 bar), avoids a shutdown of the compressor if the intake manifold pressure rises due to fluctuations that may occur during engine operation or otherwise do not indicate a sufficiently high engine load condition that warrants shutdown of the compressor. In this manner, a sufficient rise in intake manifold pressure is recognized by the circuit 10 that acceleration of the vehicle has begun or the vehicle is otherwise under an increased load condition and shutdown of the compressor is desirable to promote the operating efficiency of the engine. Any resulting fuel economy savings will depend on the use of the vehicle's air-conditioning system and the driving habits of the vehicle's operator.

FIG. 2 further indicates that the circuit 10 also operates to switch the compressor "on" if, due to sustained high engine loading conditions, the average pressure (plus any offset) rises above the instantaneous pressure reading. Logically, a similar result occurs if the instantaneous pressure reading were to drop, for example, if the vehicle were no longer accelerating or on an incline.

By the comparison of the average pressure (plus any offset) to the instantaneous pressure reading, the circuit 10 is capable of being adapted to essentially any vehicle and/or engine combination, as well as prolonged periods of high engine load. The latter is useful as a safety feature because, even while the vehicle is operating under a high engine load, the circuit 10 is adapted to eventually switch the compressor "on" if the vehicle's HVAC controls are set to defrost. As such, the comparison of average to instantaneous pressure readings is compatible with the vehicle's entire HVAC system, such as when the air-conditioning system is engaged and the air-conditioning compressor is required to operate, for example, when operation of the windshield defroster is required for safety issues.

The averaging time constant can be adjustable and based on "under hood" or ambient temperatures. For example, a longer time constant can be provided on cooler days while a shorter time constant may be preferred on hotter days, which results in the compressor being off for longer periods of time on cooler days and off for shorter periods of time on hotter days.

The circuit 10 can also be configured such that the compressor is switched off for a predetermined minimum amount of time, such as about two seconds (shorter and longer times are foreseeable), so as to prevent the clutch from rapid on/off cycling of the compressor, which could occur if the vehicle were accelerating and decelerating quickly.

This switching circuit 10 can be incorporated into the ECM of new vehicles, since intake manifold vacuum is already an input to the ECM. The ECM would then perform the algorithm for stopping and starting the compressor. Alternatively, the circuit 10 can be configured as a module that can be separately installed during vehicle assembly as well as in the aftermarket. To illustrate, FIGS. 3A and 3B (showing portions of the same switching circuit 10 connected by the lines labeled as OR, WT and BK) represent an electrical schematic for the switching circuit 10 in accordance with what is believed to be a preferred embodiment of the invention. The circuit 10 can be incorporated into a module 22 represented in FIGS. 4 and 5. As illustrated, the module 22 has terminal blades 24 that enable the module 22 to replace an existing AC compressor relay, such that the module 22 can be separately installed during vehicle assembly or anytime thereafter. An inlet port fitting 26 allows a tube (not shown) to connect the module 22 to a source of the intake manifold pressure, such that the pressure sensor 18 can be located within the module 22, along with the processing circuit 20.

Figure 3A:
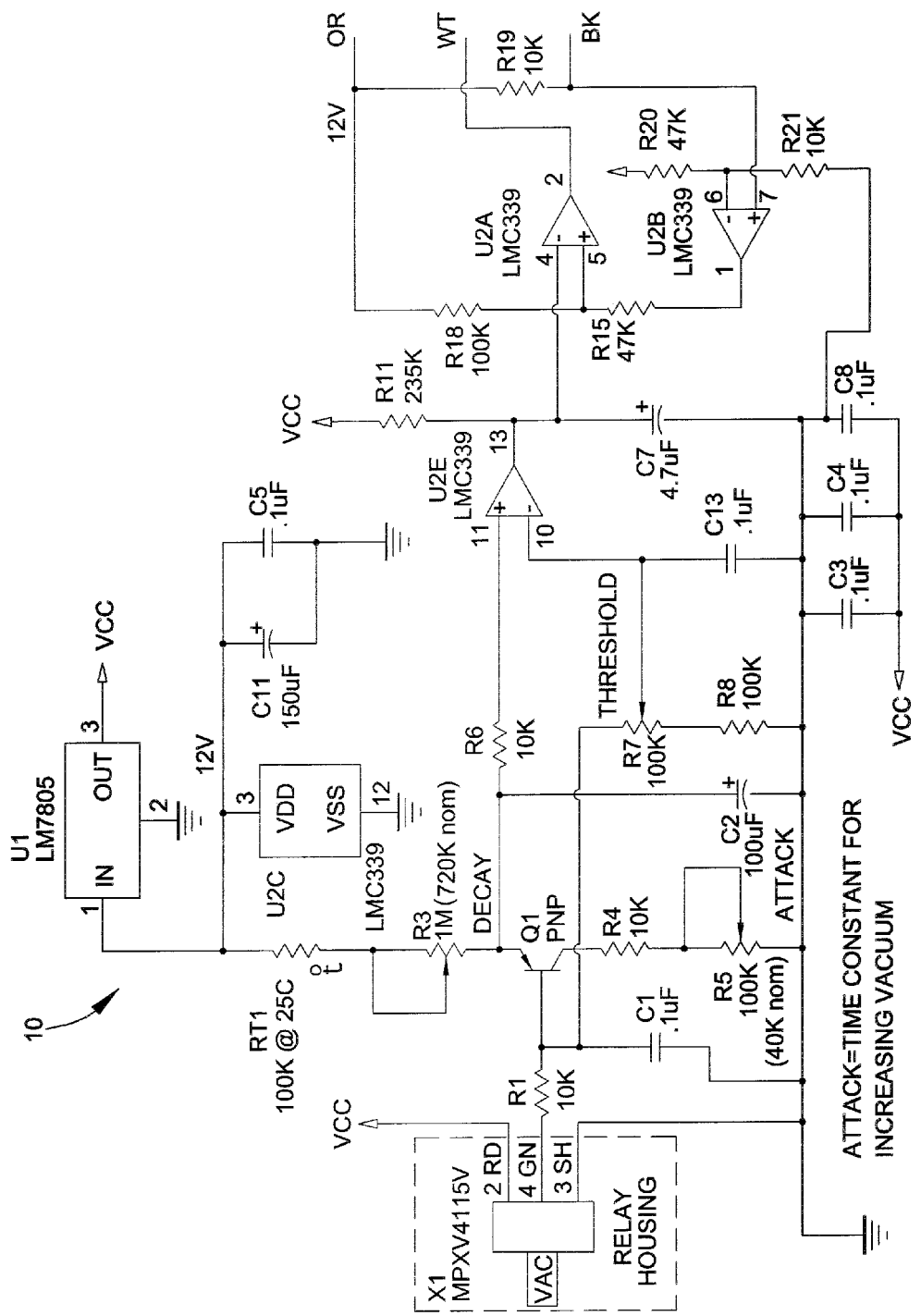

As represented in FIGS. 3A and 3B, the circuit 10 includes a pressure sensor X1 by which intake manifold pressure (or vacuum) is used as an input parameter to the circuit 10. In the embodiment of FIGS. 3A and 3B, the sensor X1 measures pressure and its voltage output is proportional to the sensed pressure reading (and therefore inversely proportional to vacuum level). The voltage output of the sensor X1 is used as the base voltage of a PNP transistor Q1, which acts as a buffer/diode to the raw signal from the sensor X1. As the sensed pressure decreases, resulting in a lower voltage at the base of the transistor Q1, a capacitor C1 is discharged from the current draw through the emitter of the transistor Q1. Inherent to the design of the transistor Q1, a voltage drop ($V_{be}$) exists between its base and emitter, for example, a voltage drop of about 0.6+/−0.1 volt. The emitter current of the transistor Q1, which is used to discharge a second capacitor C2, is approximately the voltage from the base of the transistor Q1 (+$V_{be}$) to ground, divided by the collector resistance (R4+R5), and multiplied by the beta of the transistor Q1 according to the following.

Emitter current=($V_{base}$/(R4+R5))*50

Assuming a beta value of about +/−30%, an attack time constant can be calculated as follows.

t=($V_{base}$+$V_{be}$)*C2/(Emitter current)

where C2 is the capacitance of the second capacitor C2. The attack time constant is calculated as long as the collector to emitter voltage of transistor Q1 remains above 0.2 volt. If the change in vacuum is great enough to cause the collector to emitter voltage of the transistor Q1 to drop to less than 0.2 volt, the transistor Q1 acts as a diode and beta becomes 1.

As the pressure increases (vacuum decreases), the transistor Q1 turns off and the decay time constant is initiated whose value is calculated as follows t=(RT1+R3)*C2 wherein RT1 is the resistance of a thermistor. RT1 varies inversely to the ambient air temperature, so that a higher ambient air temperature results in a lower resistance RT1. As a result, a higher ambient air temperature reduces the time constant, which reduces the compressor "off" time. On the other hand, a lower ambient air temperature increases the time constant, which increases the compressor "off" time.

If the intake manifold pressure sensed by the sensor X1 is constant (steady-state), the input to a comparator U2E is such that the pin 11 of the comparator U2E (U2E-11) is greater by an offset value of at least $V_{be}$ compared to the pin 10 of the comparator U2E (U2E-10) when a threshold pot ("THRESHOLD") is set to a minimum value. As noted above, this offset value (the OFFSET of FIG. 2) may relate to about 4.5 inches Hg (about 0.15 bar) of pressure, with the result that the intake manifold pressure can rise about 0.15 bar (corresponding to a vacuum drop of about 0.15 bar) without having any effect on the compressor due to such fluctuations being mathematically attributed to "normal" driving. As represented in FIG. 3A, the threshold pot can preferably be increased, for example, to a value of over 20 inches Hg (about 0.68 bar). However, threshold pot levels of this level could lower the absolute trigger threshold to the extent that the function of the circuit 10 would be largely disabled.

When accelerating, the higher intake manifold pressure causes the instantaneous voltage at U2E-10 to rise above the average voltage at U2E-11, triggering a low voltage condition at the U2E-13 pin. This causes the input to a pin 4 of a second comparator U2A (U2A-4) to drop to zero volts. The input to a pin 5 of the comparator U2A (U2A-5) is the AC control command from the vehicle's ECM, which if "on" is higher than U2A-4 to trigger a high output on pin 2 of the U2A comparator (U2A-2). This condition causes a gate of a MOSFET transistor Q2 to turn power off to the coil for the compressor clutch ("AC CLUTCH").

The decay time constant determines the slope of the increasing voltage at U2E-11 (corresponding to the average pressure level, i.e., the output of the sensor X1 plus any offset value). With continuing higher readings from the sensor X1, the voltage at U2E-11 eventually surpasses the voltage at U2E-10 (corresponding to the instantaneous pressure level) and U2E-13 is triggered high to cause U2A-4 to rise above U2A-5. If the ECM AC command is on, U2A-2 is triggered low, causing the gate of the MOSFET transistor Q2 to return power to the AC Clutch. On the other hand, if the ECM AC Command is off, U2A-2 will remain high to keep the AC Clutch off.

While the invention has been described in terms of specific embodiments, it is apparent that other forms could be adopted by one skilled in the art. For example, the scope of the invention also extends to the use of electrical signals from a vehicle's ECM and/or manifold vacuum transmitter to electrically monitor manifold vacuum levels, instead of directly monitoring manifold pressure, as the input for controlling the engagement and disengagement of the compressor clutch. Furthermore, as was noted above, other indications of engine load, for example, the throttle position signal of the ECM, could be used as the input parameter to the circuit 10, and the use of such alternative parameters is also within the scope of the invention. Therefore, the scope of the invention is to be limited only by the following claims.

The invention claimed is:

1. A device for promoting the efficiency of an engine of a vehicle equipped with an air-conditioning system having a compressor and a compressor clutch, the device comprising:
    means for sensing a parameter indicative of an engine load condition of the vehicle;
    means for determining a difference between an instantaneous reading of the parameter sensed by the sensing means and a calculated average based on multiple readings of the parameter sensed by the sensing means; and
    means for engaging and disengaging the compressor clutch depending on whether the instantaneous reading of the parameter is above or below the calculated average of the parameter, the engaging/disengaging means engaging the compressor clutch if the engine operates under a high load for a duration of time that results in the calculated average of the parameter becoming higher than the instantaneous reading of the parameter.

2. The device according to claim 1, wherein the engaging/disengaging means disengages the compressor clutch if the engine is operating under a high load and the instantaneous reading rises above the calculated average of the parameter.

3. The device according to claim 1, wherein the parameter is a throttle position signal of an engine control module of the vehicle.

4. The device according to claim 1, wherein the sensing means is a pressure sensor and the parameter is an intake manifold pressure of the vehicle.

5. The device according to claim 1, wherein the device comprises a module containing the determining means and the engaging/disengaging means and comprising means for plugging the module into a socket for a relay of the compressor.

6. The device according to claim 5, wherein the sensing means is a pressure sensor and the parameter is an intake manifold pressure of the vehicle.

7. The device according to claim 6, wherein the module contains the sensing means and further comprises a conduit adapted to connect the sensing means within the module to an intake manifold pressure source of the vehicle.

8. The device according to claim 1, wherein the determining means calculates the calculated average based on an average of the multiple readings of the parameter and an averaging time constant that is adjusted based on an air temperature.

9. The device according to claim 1, wherein the determining means calculates the calculated average based on an average of the multiple readings of the parameter adjusted by a predetermined offset value.

10. A method of promoting the efficiency of an engine of a vehicle using the device of claim 1, the method comprising:
    sensing with the sensing means a parameter indicative of an engine load condition of the vehicle;

determining with the determining means a difference between an instantaneous reading of the parameter sensed by the sensing means and a calculated average based on multiple readings of the parameter sensed by the sensing means; and engaging and disengaging the compressor clutch with the engaging/disengaging means depending on whether the instantaneous reading of the parameter is above or below the calculated average of the parameter, the compressor clutch being engaged if the engine operates under a high load for a duration of time that results in the calculated average of the parameter becoming higher than the instantaneous reading of the parameter.

11. The method according to claim 10, wherein the engaging/disengaging means disengages the compressor clutch in response to the instantaneous reading rising above the calculated average of the parameter while the engine is operating under a high load.

12. The method according to claim 10, wherein the parameter is a throttle position signal of an engine control module of the vehicle.

13. The method according to claim 10, wherein the sensing means is a pressure sensor and the parameter is an intake manifold pressure of the vehicle.

14. The method according to claim 10, wherein the device comprises a module containing the determining means and the engaging/disengaging means and the method further comprises plugging the module into a socket for a relay of the compressor.

15. The method according to claim 14, wherein the sensing means is a pressure sensor and the parameter is an intake manifold pressure of the vehicle.

16. The method according to claim 15, wherein the module contains the sensing means and the method further comprises using a conduit to connect the sensing means within the module to an intake manifold pressure source of the vehicle.

17. A method of promoting the efficiency of an engine of a vehicle equipped with an air-conditioning system having a compressor and a compressor clutch, the method comprising:

sensing a parameter indicative of an engine load condition of the vehicle;

determining a difference between an instantaneous reading of the parameter and a calculated average based on multiple readings of the parameter; and engaging and disengaging the compressor clutch depending on whether the instantaneous reading of the parameter is above or below the calculated average of the parameter, the compressor clutch being engaged if the engine operates under a high load for a duration of time that results in the calculated average of the parameter becoming higher than the instantaneous reading of the parameter.

18. The method according to claim 17, wherein the compressor clutch is disengaged in response to the instantaneous reading rising above the calculated average of the parameter while the engine is operating under a high load.

19. The method according to claim 17, wherein the parameter is a throttle position signal of an engine control module of the vehicle.

20. The method according to claim 18, wherein the parameter is an intake manifold pressure of the vehicle.

21. The method according to claim 18, wherein the determining and engaging/disengaging steps are performed with a device comprising a module and the method further comprises plugging the module into a socket for a relay of the compressor.

22. The method according to claim 21, wherein the parameter is an intake manifold pressure of the vehicle, the sensing step is performed with a sensing means within the module, and the method further comprises connecting a conduit to the sensing means and to an intake manifold pressure source of the vehicle.

23. The method according to claim 17, wherein the determining means calculates the calculated average based on an average of the multiple readings of the parameter and an averaging time constant that is adjusted based on an air temperature.

24. The method according to claim 17, wherein the determining means calculates the calculated average based on an average of the multiple readings of the parameter adjusted by a predetermined offset value.

* * * * *